May 20, 1952      J. NEAL, SR      2,597,556
HOLDUP SIGNALING DEVICE
Filed July 21, 1948      2 SHEETS—SHEET 1
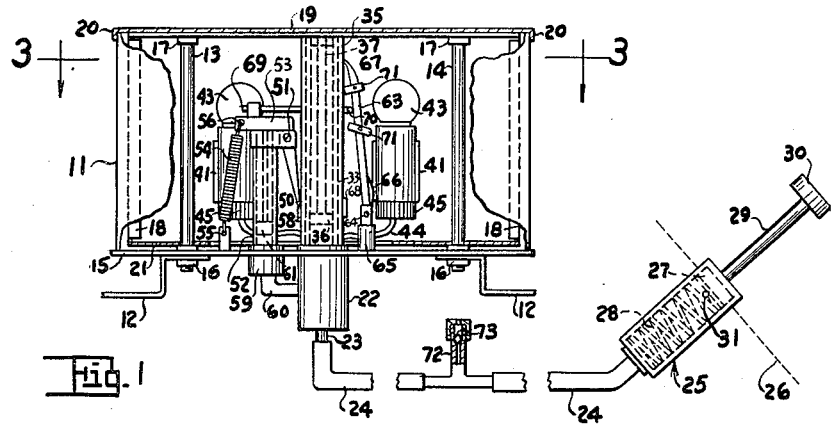
INVENTOR.
JAMES NEAL SR.
BY Robert A. Sloman
ATTORNEY.

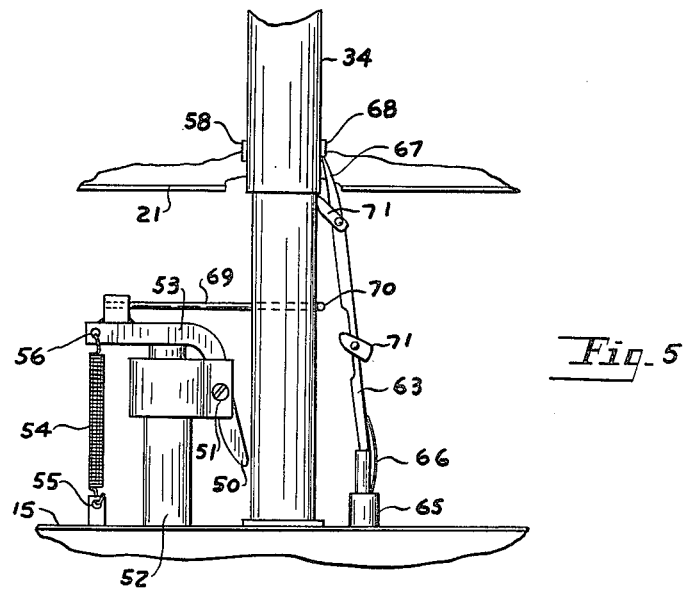
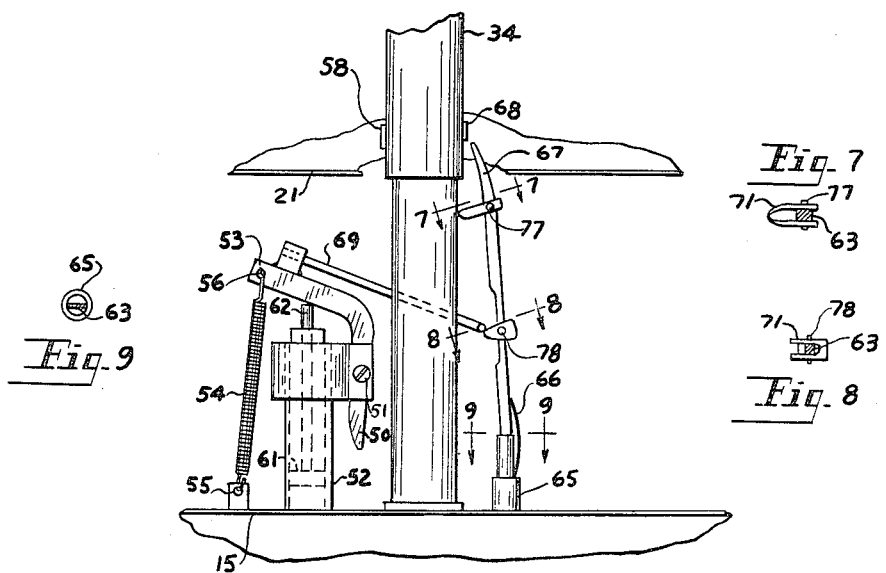

Patented May 20, 1952

2,597,556

UNITED STATES PATENT OFFICE 2,597,556

HOLDUP SIGNALING DEVICE

James Neal, Sr., Detroit, Mich.

Application July 21, 1948, Serial No. 39,885

4 Claims. (Cl. 116—39)

This invention relates to a holdup signalling device and more particularly to a manually controlled hold up signalling device adaptable for use on automobiles, or other vehicles, or trains, banks, etc.

More particularly the device includes an illuminated signalling device which is actuated and energized from a remote point such as the driver's seat in a vehicle, to indicate that a hold up is taking place, and this without the knowledge of the party participating in the holdup.

More particularly the hold up signalling device is pneumatically or hydraulically operated so that upon manual actuation of a plunger by the driver's foot, a remote signal will be elevated and illuminated, for instance upon the back of the vehicle.

The device consists of a hollow housing to be mounted upon the back or side of a vehicle, and containing a vertically adjustable illuminated signalling element, preferably showing the words "hold up," which is adapted to be moved upwardly from its enclosing housing, upon energization by the driver, or the teller in a bank, for instance, with the signalling device being remote from the teller.

The device also includes a hydraulic or pneumatic cylinder which is joined by a suitable conduit with the cylinder within which a manually actuated plunger is positioned, and whereby actuation of said plunger will deliver pressure fluid, i. e. air or liquid to the cylinder within the signal device housing. The movable or elevatable hold up indicating device carries a piston rod and piston which is normally positioned within the cylinder in said housing and which is adapted for elevation with respect thereto upon manual application of said plunger, as by the driver's foot in the case of an automobile or a taxi cab.

The aforementioned device is fully illustrated in the accompanying drawing in which:

Figure 1 is a partially broken away and sectioned elevational view of the signal device housing and including its vertically adjustable signalling element.

Figure 2 is a similar view with the signalling element shown in its uppermost energized position.

Figure 3 is a plan section on line 3—3 of Figure 1;

Figure 4 is a fragmentary elevational view on line 4—4 of Figure 3.

Fig. 5 is a fragmentary elevational view on an enlarged scale illustrating the latching mechanism with the signal device secured in elevated position.

Fig. 6 is a similar view showing the latch mechanism released to permit downward movement of the signal device.

Fig. 7 is a section on line 7—7 of Fig. 6.

Fig. 8 is a section on line 8—8 of Fig. 6; and

Fig. 9 is a section on line 9—9 of Fig. 6.

It will be understood that the above drawing illustrates merely a preferable embodiment of the invention and that other embodiments are contemplated within the scope of the claims hereafter set out.

Referring to the drawing and particularly Figures 1, 2 and 3, a hollow signal housing 11 is shown normally adapted for positioning upon the rear of a vehicle, secured thereon in any convenient manner as for instance by the two downwardly extending brackets 12.

Said housing may be in any shape, but is preferably shown as substantially rectangular for convenience of illustration. A pair of upright guide posts 13 and 14 are centrally mounted in spaced relation within housing 11, with their lower ends projecting through its base 15, and through corresponding openings in the brackets 12. Nuts 16 are threadably mounted upon the lower ends of the shafts 13 and 14 and serve not only to retain the brackets 12 in position but also to secure the posts 13 and 14 in the upright position shown in Figures 1 and 2.

Annular or square stops 17 are mounted upon the upper ends of shafts 13 and 14 and are adapted to limit the upward sliding movement of signal support 18, the latter being shaped corresponding to the shape of the outer enclosing housing 11.

Signal support 18 has a cover 19 whose outer downwardly extending peripheral flange 20 extends beyond the outer wall of support 18 and is adapted to overlie the side wall of housing 11 when in the relative position shown in Figure 1.

Signal support 18 also has a base portion 21 and a pair of corresponding small openings are formed therein for cooperative sliding engagement of said base 21 with respect to the upright posts 13 and 14. It is seen also that base 21 will engage the stops 17 in the position relatively of the parts in Figure 2 if signal support 18 should be projected upwardly manually or otherwise beyond the position shown therein.

Referring to Figures 1 and 2 cylindrical fluid supply housing 22 projects from base 15 downwardly and has a fluid intake pipe 23 at its lower end in communication with the flexible conduit 24. Said conduit extends to the front portion of the vehicle such as to a position under the floor board adjacent the driver's seat and is joined to a cylinder 25 which projects partially through the vehicle floor board diagrammatically indicated at point 26 in Figure 1.

A plunger or piston 27 is slidably positioned within cylinder 25 and is normally maintained in the position shown in Figure 1 as by a suitable coil spring 28 for example. Rod 29 projects upwardly from piston 27 and slidably through the corresponding opening in the upper end of cylinder 25, and has at its outer portion a manually actuatable knob or button 30. An air vent 31 is shown within the cylinder 25 in Figures 1 and 2 to thereby permit the automatic return of the plunger 27 under action of coil spring 28.

Consequently manual application of button 30 as by the driver's foot will provide for the application of hydraulic or pneumatic pressure within cylinder 22, there being a suitable pressure relief valve 72 provided in flexible conduit 24.

The upper end of cylinder 22 projects upwardly through a central portion of housing base 15 and has joined thereto in fluid communicating relation hollow cylinder 33 which projects upwardly therefrom in parallel relation to the rods 13 and 14.

As viewed in Figures 1 and 2 a corresponding guide cylinder 34 is secured at points 35 to the central interior portion of support cover 19, and projects downwardly so as to enclose in telescoping relation actuating cylinder 33, thereby providing a further guide for the vertically adjusted signal support 18. It will be noted that the interior diameter of cylinder 34 is slightly greater than the exterior diameter of cylinder 33 so that the latter is in sliding engagement therewith.

Piston 36 is carried at the lower end of piston rod 37, the latter being preferably joined to cover 19 at its upper end, though this is not necessary to the operation of the device. In any event piston and piston rod 36, 37 are normally nested within cylinder 33 as shown in Figure 1 when the signalling device is inoperative, but will assume the relative position shown in Figure 2 with respect to cylinder 33 when said signalling device is energized by the manual application of pressure, to the button 30 associated with plunger 27 in cylinder 25.

As shown in Figures 2 and 3 a pair of vertically slotted guides 38 are formed in the forward portions of signal support 18 at its opposite ends, and a suitable transparent rectangular plate 39 preferably constructed of glass is slidably positioned and nested within said guides.

The words "Hold Up" 40 are printed or otherwise etched upon the glass plate 39 and will visibly designate the existence of a hold up when the driver applies manual pressure to the plunger 27, should there be such a hold up.

Suitable illuminating means are provided which are energized when the signal support 18 is elevated to the position shown in Figure 2.

More particularly a pair of bulb sockets 41 are mounted in spaced relation upon the upright wall 42 at the rear of support 18, respectively mounting the bulbs 43, with suitable electrical leads 44 joining the bulb contacts 45 within sockets 41. Leads 44 are joined at their other ends to the contactor 46 which is carried upon the lower outer portion of wall 42 of signal support.

A corresponding stationary contactor 47 is carried adjacent the upper portion of the interior rear wall of housing 11, and in the position shown in Figure 1 contactors 46 and 47 are in spaced relation. A source of electrical energy is indicated by the two leads 48, one of which is grounded to housing 11 whereas the other is joined to the stationary contactor 47.

With signal support 18 in its energized elevated position as in Figure 2, contactors 46 and 47 engage each other as best illustrated in Figures 3 and 4 of an electric circuit is established through the bulbs 43 mounted within their respective sockets 41.

As diagrammatically shown in Figure 4 a suitable current interrupter 49 is interposed within one of the current leads 48 whereby bulbs 43 will intermittently flash off and on to thereby render the hold up signal more attractive to the attention of another.

When inoperative a latch is provided within housing 11 to normally retain signal support 18 in its lowermost position as shown in Figure 1. Pointed latch arm 50 is pivotally mounted at 51 to the supporting cylinder 52, and has a horizontally extending portion 53 which extends over the top of cylinder 52.

Coil spring 54 anchored at 55 at one end is secured at its other end at point 56 to the latch arm 53 to normally maintain latch 50 that is its pointed end in retaining engagement with the top surface of the lateral projection 58 carried at the lower end of cylindrical guide 34 which depends downwardly from cover 19 of signal support 18.

As viewed in Figure 1 latch arm 50 effectively locks signal support 18 within housing 11 to prevent its removal or accidental dislodgement.

The lower end of cylinder 52 terminates in the cylindrical extension 59 which projects through base 15 of housing 11 and whose interior is in communication with the interior of cylinder 24 in view of the interconnecting conduit 60.

Piston 61 is slidably positioned within latch cylinder 52 and has an upwardly extending rod 62 whose upper end is adapted to operatively engage the lower portion of pivotal latch arm 53.

Consequently on manual application of the plunger 27 which forms a part of the remote manual control pressure fluid is transmitted simultaneously to both cylinders 33 and 52. It follows that the pressure fluid in cylinder 52 will cause upward movement of its piston and piston rod which in turn causes a clockwise rotation of latch arm 50 against the action of coil spring 54, to disengage said latch arm from the lateral projection 58 to release signal support 18 and permit its upward adjustment through the operation of hydraulic cylinder 33.

A second latch arm 63 is pivotally mounted at 64 to the upright support 65 carried upon the base 15 of housing 11. A suitable leaf spring 66 bears against latch arm 63 tending to maintain its outer pointed end 67 in a direction towards the guide sleeve 34.

As the signal support 18 is elevated to the position shown in Figure 2 said pointed latch end 67 retainingly projects below the undersurface of lateral projection 68 so as to maintain the same as well as the signal support 18 in its elevated position.

In order to release the second latch arm 63 and to permit the fall of signal support 18 by gravity a hydraulic or pneumatic means is employed which includes the hydraulic latch operating cylinder 52 and the formed latch engaging arm 69.

As shown in Figures 1, 2 and 3 arm 69 is suitably secured adjacent the outer end of latch arm 53 and is so formed as to extend around cylindrical guide 34 with its outer inturned end 70 adapted for operative engagement with lower detent 71 on secondary latch arm 63.

To secure release of secondary latch 63 it is necessary to again activate the manual control 30 and its plunger 27 to transmit sufficient pressure fluid to cylinder 52 so as to cause an upward movement of the piston 61. This in turn causes a clockwise rotation of latch arm 53 and a corresponding movement of the arm 69 engaging lower detent 71 to thereby project secondary latch arm 63 also to the right sufficiently to disengage its pointed end 67 from the lateral projection 68 of the guide sleeve 34, as in Fig. 6.

The upper detent 71 is pivotally mounted at 77 to the latch arm 63 whereas the lower detent 71 is pivoted to the latch arm 63 at point 78. In operation the upper detent is initially in the position shown in Figs. 1 and 6, however upward movement of the cylinder 34 carries therewith the projection 68, and this element as it passes said upper detent tilts the same to the position shown in Fig. 5. To facilitate lowering of the cylinder 34 as above described there is a second energization of the piston 61 with its cylinder 52 and this causes the pivotal arm 50—53 to assume the position shown in Fig. 6 with the outer end of the arm 69 cooperatively engageable with the lower detent to move the latch arm 63 outwardly from engagement with the boss 68. This outward movement permits the upper detent to pivot in a counterclockwise direction from the position shown in Fig. 5 to the position shown in Fig. 6, whereby said upper detent maintains the upper portion 67 of latch arm 63 away from and out of the path of cylinder 34 and the boss 68, so that said cylinder will drop by gravity when the fluid pressure is released.

So released the sleeve 34 is permitted to descend carrying therewith signal support 18 until the latter has returned to the initial position shown in Figure 1. At this point the spring retained latch arm 50 reengages the lateral projection 58 of sleeve 34 to effectively lock signal support 18 in its lowermost position.

As shown in Figures 1 and 2 a suitable pressure relief valve 72 is interposed in a fluid line 24. When the plunger 27 is projected downwardly under manual pressure as by the driver's foot, the ball 73 within valve 72 will be projected outwardly to close the opening in the valve so that the fluid pressure will be directed to both of the cylinders 33 and 52.

Once the signal support 18 has been hydraulically or pneumatically elevated and secured in its elevated position by the latch 63, and the pressure is removed from the line 24 as by release of the plunger button 30, the pressure within cylinder 33 can be gradually released by bleeding through the pressure relief valve 72.

This is particularly important where a second application of pressure is required to effect the release of secondary latch 63, for as soon as the guide 34 is released the same will have a tendency to move downwardly by gravity together with the signal support 18 secured thereto and in this case the pressure of fluid established within the line 24 can be permitted to bleed out through the pressure relief valve 72 to thereby permit downward movements of piston 36 within cylinder 33.

When operated pneumatically employing the use of compressed air, it is quite clear that the air pressure built up can be gradually bled out through pressure relief valve 72. In the event that hydraulic fluid is employed it will be necessary to provide a suitable storage cavity for the fluid as it is bled off through relief valve 72. At the same time said storage cavity would be in communication with the fluid conduit 24.

For the purpose of illustration such a fluid storage cavity is indicated in dotted lines at point 74, being in communication with pressure relief valve 72 by a suitable pipe 75, and in communication with conduit 24 by a suitable pipe 76. It may be necessary to interpose a one way valve 77 in the conduit 76.

Having described my invention reference should now be had to the claims which follow for determining the scope thereof.

I claim:

1. A hold up signalling device comprising a housing, a signal support normally positioned therein, hydraulic mechanism in said housing interconnecting said housing with said support for effecting relative upward movement of the latter, a manually controlled remote source of pressure fluid joined to said mechanism, a latch in said housing retainingly engaging said support, secondary hydraulic mechanism interconnecting said latch and said first hydraulic mechanism for releasing said support upon application of said manual control, a second latch retainingly engaging said support when in elevated position whereby said manual control may be released, and means interconnecting said latches for releasing said second latch upon a second application of said manual control.

2. A hold up signalling device comprising a housing, a signal support normally positioned therein, operative mechanism in said housing joined to said support for elevating said support relative to said housing, a remote manual control joined to said mechanism, a latch in said housing retainingly engageable with said support, second operative mechanism interconnecting said latch and said first operative mechanism for releasing said support upon application of said manual control, a second latch retainingly engaging said support when in elevated position whereby said manual control may be released, and means interconnecting said latches for releasing said second latch upon a second application of said manual control.

3. A hold up signalling device comprising a hollow housing, a signal support normally positioned therein, a pair of spaced upright guide rods within said housing slidably engaged within corresponding openings formed in said support, a hydraulic cylinder in upright position within said housing, a downwardly depending guide cylinder of slightly increased diameter projecting from the top of said support and adapted for sliding movement upon the outside of said first cylinder, a piston rod and piston within said guide cylinder adapted for sliding movement within said first cylinder, and a manually controlled remote source of pressure fluid joined in communicating relation with the interior of said first cylinder for effecting vertical movement of said support relative to said housing.

4. A hold up signalling device comprising a hollow housing, a signal support normally positioned therein, a pair of spaced upright guide rods within said housing slidably engaged within corresponding openings formed in said support, a hydraulic cylinder in upright position within said housing, a downwardly depending guide cylinder of slightly increased diameter projecting from the top of said support and adapted for sliding movement upon said first cylinder, a piston rod and piston within said guide cylinder adapted for sliding movement within said first cylinder, a manually controlled remote source of pressure fluid joined in communicating relation with the interior of said first cylinder for effecting vertical movement of said support relative to said housing, a latch in said housing retainingly engaging said support, a second hydraulic cylinder with associated piston interconnecting said latch and said first hydraulic cylinder for releasing said guide cylinder upon application of said manual control, a second latch retainingly engaging said support when in elevated position whereby said manual control may be released, and means interconnecting said latches for releasing said second latch upon a second application of said manual control.

JAMES NEAL, Sr.

REFERENCES CITED

The following references are of record in the file of this patent:

UNITED STATES PATENTS

| Number | Name | Date |
|---|---|---|
| 282,570 | Rushforth | Aug. 7, 1883 |
| 357,779 | Mills | Feb. 15, 1887 |
| 1,290,639 | Morin | Jan. 7, 1919 |
| 1,292,790 | Jackson | Jan. 28, 1919 |

FOREIGN PATENTS

| Number | Country | Date |
|---|---|---|
| 368,178 | France | Sept. 28, 1906 |